J. WHITTEMORE.
MEANS FOR CONVEYING GLASS TO MOLDS.
APPLICATION FILED AUG. 23, 1918.
1,399,176. Patented Dec. 6, 1921.
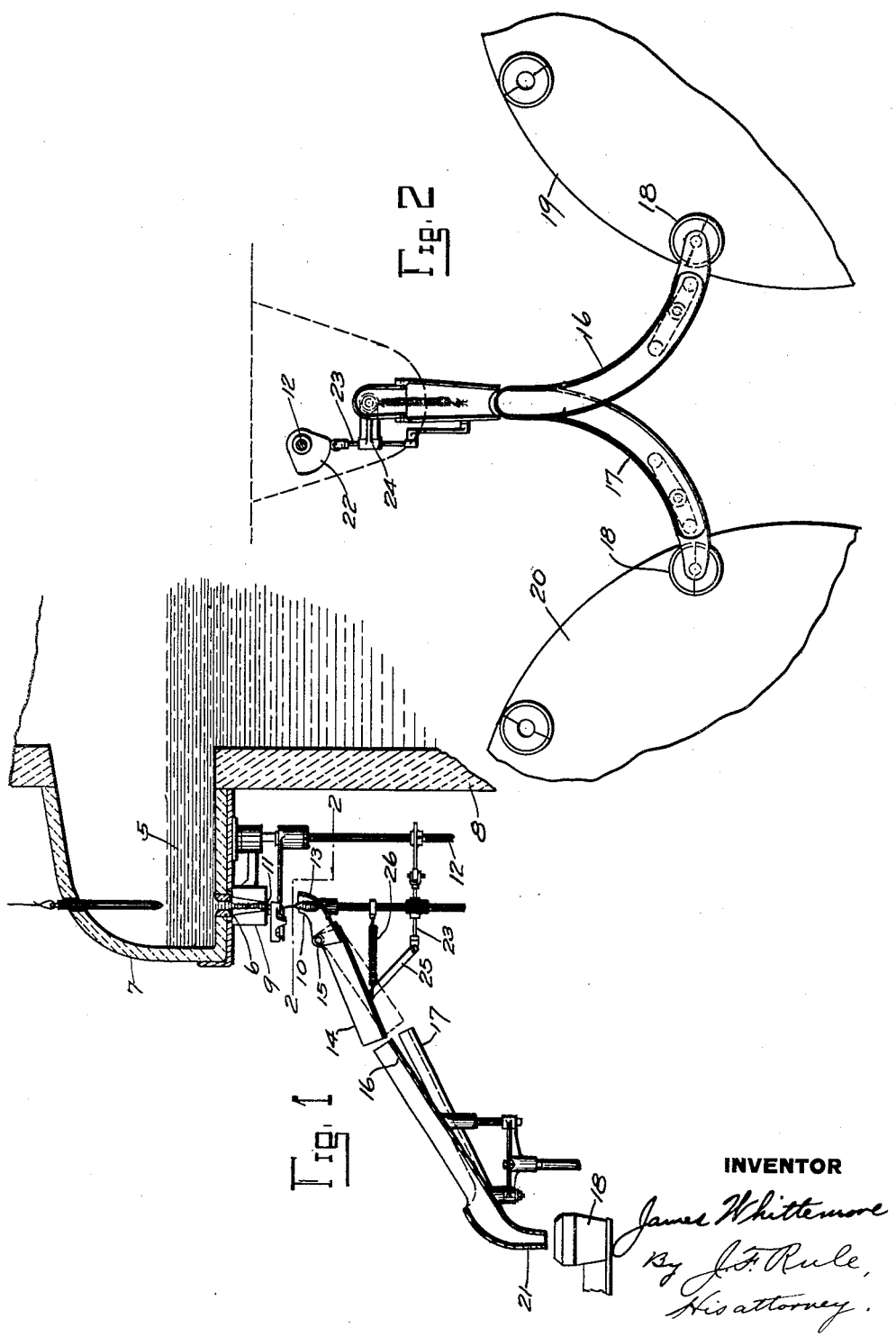
INVENTOR
James Whittemore
By J. F. Rule,
His attorney.

UNITED STATES PATENT OFFICE.

JAMES WHITTEMORE, OF DETROIT, MICHIGAN, ASSIGNOR TO THE OWENS BOTTLE COMPANY, OF TOLEDO, OHIO, A CORPORATION OF OHIO.

MEANS FOR CONVEYING GLASS TO MOLDS.

1,399,176.　　　　Specification of Letters Patent.　　Patented Dec. 6, 1921.

Application filed August 23, 1918. Serial No. 251,067.

*To all whom it may concern:*

Be it known that I, JAMES WHITTEMORE, a citizen of the United States, residing at Detroit, in the county of Wayne and State of Michigan, have invented new and useful Improvements in Means for Conveying Glass to Molds, of which the following is a specification.

My invention relates to means for transferring molten glass from a furnace or gob forming apparatus to molds. An object of the invention is to provide improved means for transferring the charges of glass from a single flowing device or gob forming apparatus alternately to the molds of different glass forming machines, thereby permitting a number of machines to be fed from a single source.

In its preferred form the invention comprises inclined troughs or chutes with their upper ends superposed and the lower ends diverging laterally to discharge the glass into molds on different machines. The charges of glass are directed alternately to the two troughs by means of a hinged section or switch, the lower end of which moves up and down to register alternately with the stationary troughs. The switch may be actuated in timed relation to a gob forming apparatus by which the flowing stream of glass is formed into individual charges or gobs.

Other features of the invention will appear hereinafter.

In the accompanying drawings: Figure 1 is a sectional elevation of an apparatus embodying the principles of my invention.

Fig. 2 is a plan view of the same.

Molten glass 5 flows through a discharge aperture 6 in the bottom of a boot or extension 7 of a continuous melting furnace 8. The glass accumulates in a sectional cup 9 to form charges or gobs 10. The cup sections are periodically separated to permit the gobs to drop. A knife 11 severs each gob from the oncoming stream and forms a temporary bottom for the cup as the next charge accumulates. The knife and cup sections are operated by means of cams on a cam shaft 12.

The gobs 10 drop onto a stationary trough section or guide 13 and from the latter onto a trough section or switch 14 having a pivot 15 permitting the lower end of the switch to swing up and down to register alternately with stationary chutes 16 and 17. These chutes are arranged to convey the gobs alternately to the molds 18 on the two mold tables 19 and 20. The mold tables form parts of glass forming machines, the glass being molded by pressing or blowing in the molds to form bottles or other ware. Each mold table is rotated to bring the molds in succession to a position beneath the discharge end 21 of the chute. The mold tables may be rotated step by step and the step rotations of the two tables is in alternation and in timed relation to the gob forming operation, so that each mold when brought beneath a chute 16 or 17 receives a charge of glass.

The movements of the switch 14 may be controlled from the cam shaft 12 which makes one half of a complete rotation during the formation of each gob. A cam 22 on the shaft 12 actuates a rod 23 mounted to slide lengthwise in a bearing 24, said rod connected through a link 25 to the trough 15. The cam operates through these connections to move the switch upward into register with the trough 16 and holds it in such position while a charge of glass slides down the switch onto the trough 16. After the high portion of the cam passes beyond the rod 23 the trough swings downward by gravity assisted by a spring 26 into register with the trough 17, the upper end of which is directly beneath the trough 16, so that the next charge is delivered to the trough 17. The switch 14 is shown as a separate element form the section 13 directly beneath the flow opening but such parts may be made in a single piece if preferred, so that the gobs are delivered from the forming cup directly onto the switch.

Variations may be resorted to without departing from the spirit and scope of my invention.

What I claim is:

1. In apparatus for transferring molten glass, the combination of chutes having their receiving ends arranged one above the other, said chutes being laterally divergent, and means to supply molten glass alternately to said chutes.

2. The combination with means to supply charges of molten glass, of troughs or chutes having their receiving ends arranged one above the other, and means to direct the charges of glass alternately to said chutes.

3. The combination with means to supply charges of molten glass, of troughs or chutes having their receiving ends arranged one above the other, means to direct the charges of glass alternately to said chutes, said means comprising a downwardly inclined trough section, and means to move the lower end of said section up and down into register with the troughs alternately.

4. The combination of downwardly inclined chutes having their upper ends arranged one above the other and their lower ends laterally divergent, an auxiliary chute, and means to switch said auxiliary chute up and down into register with the upper ends of said inclined chutes alternately.

5. The combination with means for supplying charges of molten glass, of an inclined trough or chute to which the glass is delivered, means for swinging the lower end of the trough up and down to different discharge positions, and means for conveying the glass from said discharge positions to different mold positions.

6. The combination with glass forming machines, each comprising a series of molds, of means for supplying molten glass, downwardly inclined troughs having their lower ends positioned to discharge respectively into the molds on said machine, the upper ends of said troughs arranged one above the other, and a glass guiding switch having its discharge end movable up and down to register alternately with the said troughs.

7. The combination with glass forming machines, each comprising a series of molds, of means for supplying molten glass, downwardly inclined troughs having their lower ends positioned to discharge respectively into the molds on said machines, the upper ends of said troughs arranged one above the other, and a glass guiding switch having its discharge end movable up and down to register alternately with the said troughs, means to form the glass into gobs and deliver them to the switch, said machines operable to move the molds successively into position to receive the gobs, and mechanism to actuate the gob forming means and said switch in timed relation to the movements of the molds.

Signed at Detroit, in the county of Wayne, and State of Michigan, this 14th day of August, 1918.

JAMES WHITTEMORE.